United States Patent Office 2,966,447
Patented Dec. 27, 1960

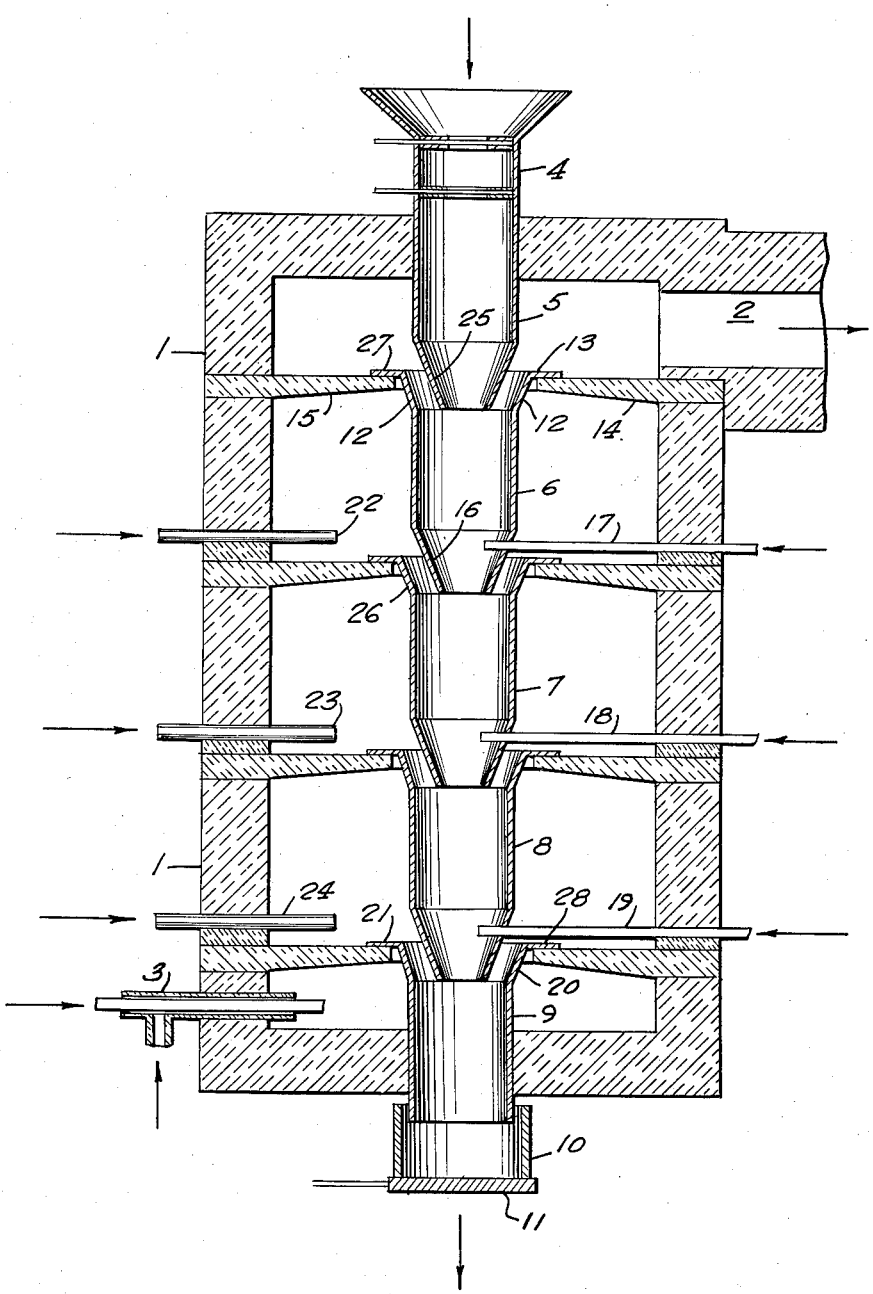

2,966,447

APPARATUS FOR MANUFACTURING ACTIVE CARBON

Hermine Johanna Walter, 35 Prospect St., Dover, N.J.

Filed Dec. 2, 1957, Ser. No. 700,111

4 Claims. (Cl. 202—121)

My present invention relates to a new and useful process and apparatus for manufacturing active carbon, whereof the following is a specification.

It is well known that active carbon is prepared by contacting activating gases such as steam with charcoal or other carbonaceous material at high temperatures, for instance, at about 1000° C. However, the apparatus heretofore used for this purpose are rather complicated and consequently operation and maintenance of such apparatus are rather expensive. In addition thereto operation control is quite difficult.

My new process overcomes the above mentioned difficulties and consists, in principle, in contacting charcoal or other carbonaceous material at a high temperature with activating gases such as superheated steam, air, oxygen, sulfur, carbon dioxide or mixtures thereof. For this purpose the activating gases are introduced into the bed of said carbonaceous material. The term "carbonaceous material" designates any organic matter of a carbon content of at least 50%. Thus, as starting carbonaceous material, there may be used charcoal made of hard or soft wood, carbonized coconut hulls, or of various nut material like nut shells, apricot pits or any other fruit pit. Furthermore any kind of fossile coal like peat, lignite or anthracite coal, both carbonized or genuine, can be used in my process and apparatus.

One of the most important features of my invention is based on the following discovery. When superheated steam is passed over carbonaceous material under conventional conditions, the carbonaceous material near the entrance point of the steam is quickly activated and frequently "over-activated" i.e. burned to ashes. In this activation process steam is converted into hydrogen and carbon monoxide. The resulting mixture of carbon monoxide and hydrogen represents a gaseous by-product of the activation process which is no longer useful for further activation but rather acts as a diluent for any steam still present. This in turn results in an early retardation of the activation process. These drawbacks are readily overcome according to the present invention by removing said diluting gaseous activation products from the activation zones before the concentration of said gaseous diluents exceeds concentrations, for instance, as high as 80% or even 90%. In order to achieve this result, the activating gases are introduced at several points into the bed of carbonaceous material and the gaseous activation products are withdrawn at points spaced from the points of introduction where the steam concentration has decreased to a concentration between 0% and 20%.

Actually the time of retention, i.e. the time which is required to develop the desired adsorptive power, depends on several factors viz the activation temperature, the nature of carbonaceous material used, and its particle size. The higher the temperature, the faster proceeds the activation. Higher temperatures between 950° C. and 1150° C. are generally useful for making decolorizing carbons. Temperatures ranging between 850° C. and 1050° C. are frequently useful for making carbon for gas-masks. Starting materials of higher density like coconut hulls or briquetted charcoal of any provenience require longer activation times than loose or pulverulent charcoal which can also be subjected with advantage to the activation process according to the present invention. As a general rule however it can be stated that the decrease in weight of the carbonaceous material during activation presents a reliable and satisfactory rule for achieving any desired degree of activation. For making decolorizing carbon, activation is continued until the weight of the carbonaceous material has decreased to between 50% and 75% of its initial weight and, generally, to between 60% and 70% of said weight. In making active carbon for gas-masks or for use as catalyst, activation is continued until the final weight of the activated carbon is between 30% and 60% of the initial weight and preferably between 35% and 60% of said weight. These values can easily be achieved especially in continuous operation of my process by determining the weight of carbonaceous material charged per unit of time and the weight of activated carbon collected, likewise per unit of time. Of course my process can likewise be carried out in batches.

The gaseous activation products withdrawn from the activation zones may be collected and burned by means of air in order to provide the heat necessary for activation. However it is of advantage to burn said gaseous products immediately after their withdrawal from the activation zones. This can be achieved in a very simple manner by arranging a number of crucibles inside a furnace provided with heating devices and flue gas vents. The crucibles are placed one above the other. When all crucibles are filled with carbonaceous material, the lower part of every crucible extends into the mass of carbonaceous material contained in the next lower crucible, thereby leaving an annular space between the lower part of the upper crucible and the upper part of the lower crucible. In this manner the carbonaceous material in all the crucibles as well as in the feed and recovery points forms a continuous bed. Superheated steam is introduced into each crucible at its lower part. Said steam travels upwardly and effects activation, whereby it is more and more diluted and replaced by carbon monoxide and hydrogen, formed as gaseous activation products. These gases will escape through the annular spaces between any two crucibles, will then be burned therein by introducing additional air and subsequently vented as flue gas. However the gaseous activation products, ascending inside every crucible, will not enter the next upper crucible because the drag outside the crucibles is considerably smaller than inside the crucibles. In this manner the above mentioned undesired dilution of the activating gases by carbon monoxide etc. is prevented in a very simple manner.

The crucibles like other parts of the furnace are made of high temperature resistant material, especially refractory material, such as chamotte, silicon-poor clay, or preferably sintered alumina, magnesia, zirconia, lime or spinells thereof. Silica and other rather acid material are less suitable, since they tend to form low melting slags with the alkaline ash produced in the activation process. Certain special metal alloys are also useful, for instance, silicon-chromium alloys or nickel-chromium alloys.

The crucibles may be of any cross-sectional shape, such as of elliptic or preferably circular cross-section. In order to facilitate the above described escape of gaseous activation products, cylindrical crucibles tapering conically inwardly at their open lower part and having a funnel-like enlarged upper part are provided. Cone-like crucibles being open at their bottom have also proved to be useful. As mentioned above the crucibles are provided with inlets or inlet holes for introducing superheated activation gases like steam near their bottom.

A preferred apparatus for manufacturing activated carbon according to the present invention is schematically shown in the annexed drawing. Furnace 1 is built with walls which are heat-insulated. The furnace can be heated by means of one or several burners 3, through which air and a combustible gas or liquid fuel are introduced and burned so as to supply heat to the interior of furnace 1. Furnace 1 is provided with flue gas exit 2 at the top of the furnace. The flue gases may be used to supply heat to a waste heat boiler and are subsequently vented through a chimney.

Carbonaceous material is fed into the apparatus through a hopper and passes through sluice 4 and feeder 5 provided at its lower end with tapered cone 25 into crucible 6 which is enlarged at its upper part 12, and having flange-like extensions 13 and 27 which rest on supports 14 and 15 provided in the wall of furnace 1. The lower part 16 of crucible 6 is tapered conically. Steam inlet 17 passes through the wall of furnace 1 into said lower part 16 as well as crucibles 7 and 8 with steam inlets 18 and 19 are of the same design and are installed in a similar manner as crucible 6 in furnace 1. Below crucible 8 there is installed discharge pipe 9 having an enlarged upper part 20 as well as flange-like extensions 21 and 28, resting on supports in the same manner as crucibles 6, 7, and 8. However, the lower part of discharge pipe 9 is not tapered but is reinforced by iron cylinder 10 which is closed with adjustable shutter 11 through which the activated carbon is discharged and recovered. The apparatus is furthermore provided with air inlets 22, 23 and 24. In addition thereto the usual instruments (not shown), such as pyrometers to measure the temperature in the crucibles, control valves (not shown) for steam inlets 17, 18, and 19 as well as for air inlets 22, 23, and 24 and the like accessories (not shown) are provided. In place of the three crucibles 6, 7, and 8, one, two, or more than three crucibles may be used, if required.

Starting and operating the apparatus is carried out as follows: Carbonaceous material is charged through sluice 4, whereby discharge pipe 9, crucibles 8, 7, and 6, and, at least partly, feeder 5 are filled with said carbonaceous material, thus forming a continuous bed. Thereby the lower end 25 of feeder 5 must be filled with said carbonaceous material, while the annular space formed by enlarged upper part 12 of crucible 6 and lower part 25 of feeder 5 remains free of carbonaceous material, thus allowing the gaseous activation products formed within crucible 6 to escape into the space between crucible 6, feeder 5, and the inner wall of furnace 1. In a similar manner the lower tapered part 16 of crucible 6 is also filled with carbonaceous material and a free annular space is left between said lower part 16 and the enlarged part 26 of crucible 7. The hot gaseous activation products, when escaping through said annular space, burn on contact with air, which may be preheated and which is introduced through pipe 22. Thereby, the burned gases heat the space between crucibles and furnace wall and so transmit heat required for activation by radiation to the interior of the crucibles. Pipes 23 and 24 are provided to introduce air into the space between crucibles 7 and 8 and the inner wall of furnace 1. As soon as required temperature has been attained and the activation process proceeds satisfactorily, activated carbon is withdrawn and collected through shutter 11. Thereupon, fresh carbonaceous material is supplied through sluice 4 and feeder 5 and operation of the apparatus effected while simultaneously introducing steam and air, either continuously or intermittently. It is obvious that the apparatus is noteworthy by the simplicity of its design and the ease with which any part of it can be repaired or replaced. Consequently the apparatus and its maintenance are inexpensive and simple.

*Example 1*

In this experiment a pilot plant apparatus as illustrated in the appended drawing was used. The inner diameter of each of the three crucibles was 2.5 inches and their height was 8 inches. The crucibles and the inner parts of the furnace were made of chamotte. Granulated beech wood charcoal of a particle size between 4 mm. and 8 mm. was used as carbonaceous starting material. The temperatures inside the crucibles were kept between 950° C. and 1020° C. while the temperature in the space between the crucibles and the furnace wall was maintained between 1200° C. and 1250° C. 19 lbs. of charcoal were charged per hour. Simultaneously 1.4 lbs. of superheated steam (900° C. to 1000° C.) were introduced into each crucible per hour. 8 lbs. of activated carbon were recovered per hour, which amounts to a yield of about 42% calculated for the amount of charcoal charged.

The resulting activated carbon is of high quality and is especially useful for gas masks or gas adsorption in general. Comparative tests with activated carbon as available on the market showed the same values in the chloropicrin test and the adsorption test for benzene-containing air.

When using, in place of granulated charcoal, briquettes or pellets made from beech wood charcoal powder, the same results were obtained. Due to the higher density of the starting material the service life with respect to the adsorptive power for benzene was also more prolonged. The activation process by means of steam represents an endothermic reaction. The heat required for the activation is supplied from the outside to the crucibles mainly by way of radiation. In large scale plants, where larger diameter crucibles are used, it may be advisable to increase the heat supply by increasing the furnace temperature between crucibles and furnace wall, for instance, to 1400° C. or 1500° C. It is also possible to use as an activation means superheated steam mixed with about 10% to 30%, by volume, of air or the equivalent amount of oxygen. In this manner the oxidation of hydrogen and coal will occur inside the crucibles and will supply the activation zones with additional heat.

*Example 2*

Cylindrical pellets made of soft wood charcoal and tar as a binder, were used as starting material. The activation was effected in a similar manner as described in the above Example 1. With such a starting material the throughput of carbonaceous material was further increased, so that the loss of weight due to activation amounted only to 35%. Thereby 13.5 lbs. of a high quality decolorizing carbon were obtained starting from 19 lbs. of said soft wood pellets. The active carbon thus obtained compared well with standard decolorizing carbon, as could be shown by the methylene blue and beet sugar molasses tests.

*Example 3*

Pulverulent charcoal made from sawdust was activated by following the procedure described in the preceding examples. Thereby, however, the activation temperature inside the crucibles was lowered to a temperature between 900° C. and 950° C. The rate with which steam was supplied, was well controlled, so as to prevent carrying along of substantial amounts of charcoal powder by the steam and the gaseous activation products. In this manner a pulverulent activated charcoal was obtained with a loss of weight of 63% calculated for the amount of starting material. The pulverulent activated charcoal showed excellent properties with respect to a detoxification of air or other gases by removing small amounts of toxic impurities such as phosgene, hydrogen sulfide and others. In order to increase the service life of the resulting pulverulent active carbon, the powder was converted into pellets by kneading it with about 4% tar, extruding the mixture, followed by superficially dusting the resulting pellets with pulverulent active coal and finally subjecting the pellets to a brief reactivation process. The pellets thus obtained exhibit an extraordinarily high adsorptive power for gases and vapors of any kind. Comparative tests showed that the service life on adsorption of chloropicrin is at least equal to that of standard active carbon, while the adsorption rate and consequently the penetration period proved decidedly superior. This carbon showed also excellent catalytic properties, as has been proved by the catalytic removal of carbonyl sulfide (COS) contained in butane gas (0.5% to 99.5%) with simultaneous admixture of 2%, by volume, of air.

When briquetting of the pulverulent active carbon with tar as described hereinabove and adding to the mixture about 5% of cupric acetate, the finally obtained active carbon pellets showed an extremely high service life with respect to the adsorption of hydrocyanic acid. This is presumably due to the excellent adsorptive power in combination with the remarkable catalytic hydrolizing action of copper salt. Likewise, other inorganic materials can be incorporated into the active carbon pellets. Active silica can be combined with active carbon, for instance, by impregnating pulverulent active carbon with gelatinous silica, as obtained by precipitating sodium silicate with any acid or by hydrolysis of silicon tetrachloride and completely eliminating of sodium salts or acids therefrom. Alumina may be incorporated in a similar manner. These pellets, when subsequently reactivated, show the noteworthy property of adsorbing benzene or other hydrophobic compounds from moist air as readily and completely as from dry air.

What I claim is:

1. An apparatus for manufacturing active carbon comprising essentially several crucibles provided at their lower parts with inlets for activating gases, and which are vertically arranged one above the other in such a manner that, when filled with carbonaceous material, the lower part of each crucible extends into the carbonaceous material contained in the next lower crucible, thus leaving an open annular space, which opens directly into and forms part of the space between the crucibles and the wall of the apparatus.

2. An apparatus for manufacturing active carbon as set forth in claim 1 characterized by crucibles having the shape of cylinders, the lower parts of which are conically tapered, and the upper ends of which open directly into the space between the crucibles and the wall of the apparatus.

3. An apparatus for manufacturing active carbon as set forth in claim 1 characterized by crucibles having the shape of cylinders, the lower parts of which are tapered while the upper ends are enlarged and open directly into the space between the crucibles and the wall of the apparatus.

4. An apparatus for manufacturing active carbon as set forth in claim 1 characterized by crucibles having the shape of cones, the upper ends of which open directly into the combustion space between the crucibles and the wall of the apparatus.

References Cited in the file of this patent

UNITED STATES PATENTS

| | | |
|---|---|---|
| 1,563,295 | Sauer | Nov. 24, 1925 |
| 1,639,356 | Wallace | Aug. 16, 1927 |
| 1,785,645 | Odell | Dec. 16, 1930 |
| 2,148,827 | McFarland | Feb. 28, 1939 |
| 2,258,818 | Sitte | Oct. 14, 1941 |
| 2,782,105 | Maisel et al. | Feb. 19, 1957 |